C. Weston,
Reciprocating Saw Mill,
Nº 28,223.     Patented May 8, 1860.

Witnesses:

Inventor:

UNITED STATES PATENT OFFICE.

CHARLES WESTON, OF SALEM, MASSACHUSETTS.

METHOD OF HANGING RECIPROCATING SAWS.

Specification of Letters Patent No. 28,223, dated May 8, 1860.

*To all whom it may concern:*

Be it known that I, CHARLES WESTON, of Salem, in the county of Essex and State of Massachusetts, have invented a new and useful Improvement in Hanging and Driving Reciprocating Saws; and I do hereby declare that the following is a full, clear, and exact description of the same, reference being had to the annexed drawings, making a part of this specification, in which—

Figure 1:
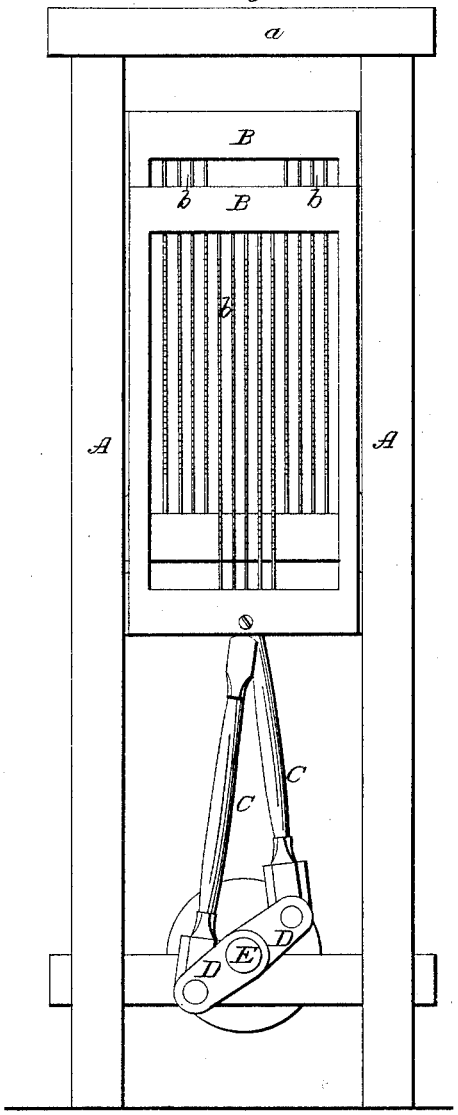
Figure 2:
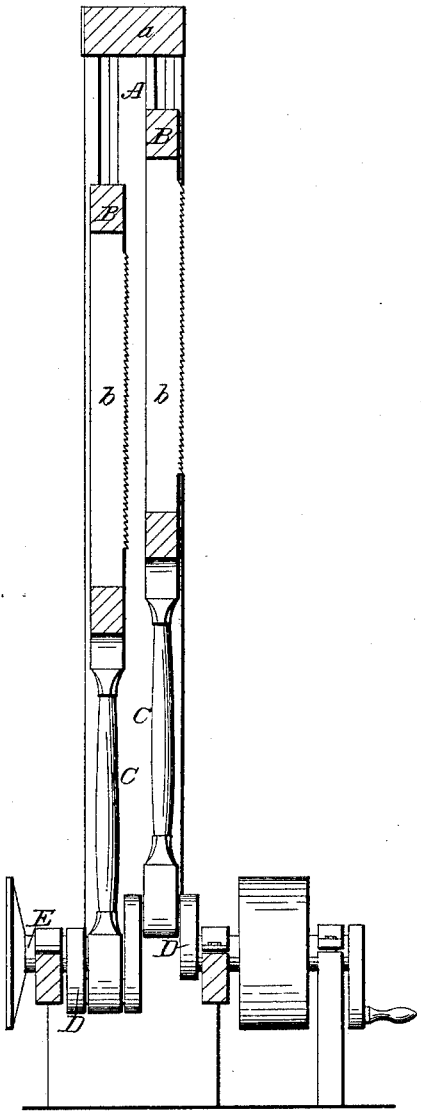

Figure 1, is a front view of my invention. Fig. 2, a side sectional view of ditto.

Similar letters of reference indicate corresponding parts in the two figures.

This invention consists in the employment or use of two reciprocating saw gates, placed one behind the other between suitable guides and operated by pitmen from reverse cranks on a driving shaft, as hereinafter described, whereby the saws are made to run with a more equable movement than hitherto and consequently rendered capable of being driven with greater velocity.

To enable those skilled in the art to fully understand and construct my invention I will proceed to describe it.

A, A, represent two uprights, the lower ends of which are attached to a suitable base, and the upper ends connected by a cross piece *a*. The inner surfaces of the uprights A, A, have each two parallel grooves made in them and these grooves form guides for the saw gates B, B, which are allowed to work freely up and down.

The lower end of each saw gate B, is connected by a pitman C, to a crank D, of a shaft E, and the cranks D, D, of the two pitmen have reverse positions so as to cause the two gates to move in opposite directions, one moving upward as the other moves downward. The two saw-gates by being thus hung are made to balance each other, and that irregular percussive movement produced by the momentum of a single gate is avoided and the two gates can be driven much more rapidly than one gate, and with less wear and tear of the operating parts.

The saws *b*, in one gate are placed in line with the spaces between those in the other gate, or, an open space may be left in one gate, and a series of saws placed in the other gate in line with the space. This latter plan is shown in the drawings. I do not however confine myself to any particular mode of arranging the saws in their gates.

This invention will greatly expedite the operation of sawing by reciprocating saws, especially where gang saws are employed, and the use of heavy pressure rollers to hold down the log are avoided. These pressure rollers being necessary in using ordinary gang-saws.

Having thus described my invention what I claim as new and desire to secure by Letters Patent, is—

The employment or use of two saw gates B, B, placed one in front of the other and connected by suitable pitmen C, C, to cranks D, D, having reverse positions relatively with each other and formed on the same driving shaft E, substantially as set forth.

CHARLES WESTON.

Witnesses:
J. B. F. OSGOOD,
HUMPHREY COOK.